Figure 1:
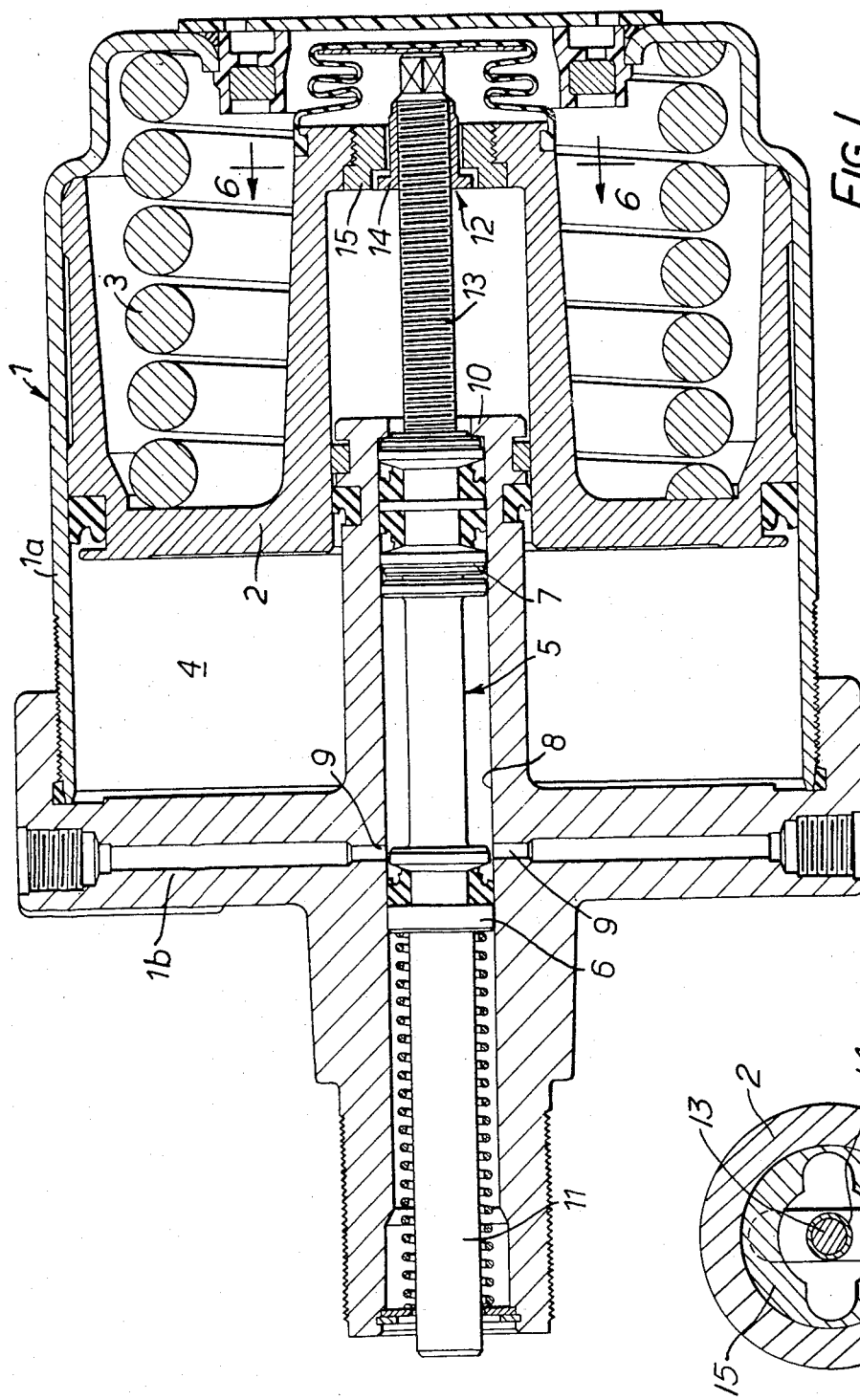

United States Patent [19]

Newstead et al.

[11] 3,943,829

[45] Mar. 16, 1976

[54] VEHICLE WHEEL BRAKE ACTUATORS

[75] Inventors: Charles Newstead; Andrew Charles Walden Wright, both of Tyseley, England

[73] Assignee: Girling Limited, Birmingham, England

[22] Filed: Dec. 19, 1973

[21] Appl. No.: 426,079

[30] Foreign Application Priority Data
Dec. 19, 1972 United Kingdom............... 58647/72
Jan. 5, 1973 United Kingdom................... 853/73

[52] U.S. Cl. ............................ 92/29; 92/30; 92/63; 92/65; 92/129; 92/130 A; 188/170
[51] Int. Cl.² ............................................. F01B 9/00
[58] Field of Search ............ 188/170; 92/20, 29, 30, 92/63, 65, 66, 129, 130

[56] References Cited
UNITED STATES PATENTS

| | | | |
|---|---|---|---|
| 3,218,939 | 11/1965 | Cruse | 92/63 |
| 3,498,188 | 3/1970 | Rodriguez | 92/63 |
| 3,665,813 | 3/1972 | Loveless | 92/30 |
| 3,782,251 | 1/1974 | Marchand | 92/63 |

FOREIGN PATENTS OR APPLICATIONS
956,195   4/1964   United Kingdom..................... 92/63

*Primary Examiner*—Trygve M. Blix
*Assistant Examiner*—Edward R. Kazenske
*Attorney, Agent, or Firm*—Scrivener Parker Scrivener and Clarke

[57]     ABSTRACT

A vehicle wheel spring brake actuator has a service braking piston and cylinder assembly and an auxiliary parking or emergency braking piston and cylinder assembly, the emergency braking piston being spring biassed towards a brake-applying position and normally held off by an opposing fluid pressure, upon release of which the spring force is transferred through the emergency braking piston and a force transferring member to the service braking piston to apply the brake. A quick release device is movable through a small distance to permit relative movement between the force transferring member to release the applied brake, the release device and the force transferring member extending through the emergency braking piston freely and with clearance.

12 Claims, 6 Drawing Figures

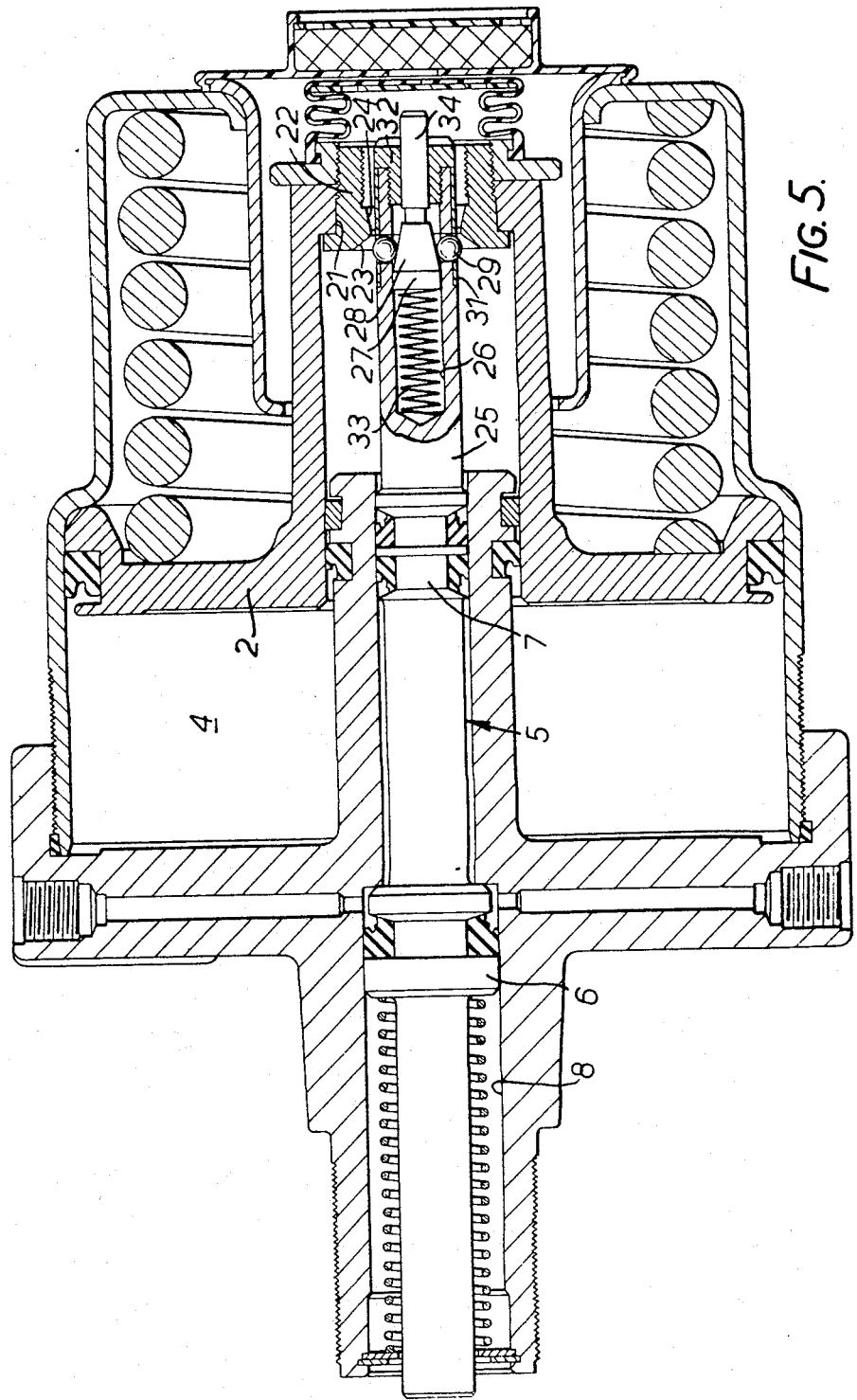

VEHICLE WHEEL BRAKE ACTUATORS

This invention relates to vehicle wheel brake actuators of the kind (hereinafter referred to as the kind set forth) comprising a first fluid pressure operable member working in a first cylinder for service braking, a second fluid pressure operable member working in a second cylinder for parking or emergency braking, the second member being spring biased towards a brake-applying position and being normally held off in an inoperative position by an opposing fluid pressure, force transferring means supported at its inner end and extending axially outwardly and movable with the second member upon release of the opposing fluid pressure so that the spring biassing force is transferred through the second member and the force transferring means to the first member, and release means manually movable to permit axial movement of the force transferring means relative to the second member in its brake-applying position to release the brake.

It is known to mount the release means directly on the second member, the spring biasing force being transferred from the second member to the force transferring means through the release means when the opposing fluid pressure is released.

It is, however, not always practical or possible to mount the release means on the second member for movement therewith and the present invention provides a vehicle wheel brake actuator of the kind set forth wherein the force transferring means and the release means extend through the second member in its inoperative position freely and with clearance, the force transferring means being engageable with the second member upon release of the opposing fluid pressure.

In one particular known actuator the release means is a bolt screw threadedly connected through the second member, which is a piston, the bolt engaging the force transferring member when the second member is in its brake-applying position so that unscrewing of the bolt relative to the piston releases the brake.

Because the need to release the brake manually generally occurs relatively infrequently, the bolt can become corroded in the piston so that it is difficult or impossible to release the brake. If the bolt cannot be unscrewed, rotation thereof effects corresponding rotation of the piston within its cylinder with resultant damage to the piston seal and consequent fluid leakage when pressure is restored. This leakage can permit continuous partial brake application with the dangerous result that the brake becomes overheated and inefficient.

Furthermore, the known actuator has the disadvantage that the release bolt has to be unscrewed through a length at least equal to the stroke of the first member i.e. the length of travel between its inoperative and brake applying positions, to release the brake. Such an unscrewing action can be time-consuming and, in confined spaces, quite difficult.

Another feature of the present invention aims at overcoming the disadvantages of the above mentioned known actuator and provides a vehicle wheel brake actuator of the kind set forth, wherein the force transferring means is disengaged from the second member in its inoperative position and engageable therewith upon release of the opposing fluid pressure, and wherein the release means is a manually operable quick release means movable to disengage the force-transferring means from the second member in its brake-applying position to permit axial movement of the force-transferring means relative to the second member to release the brake.

The term "quick release means" refers to release means which requires movement through only a short distance relative to the stroke of the first member to disengage the force-transferring means from the second member and permit movement of the first member to its inoperative position.

The actuator may be pneumatically or hydraulically operable.

Figure 6:
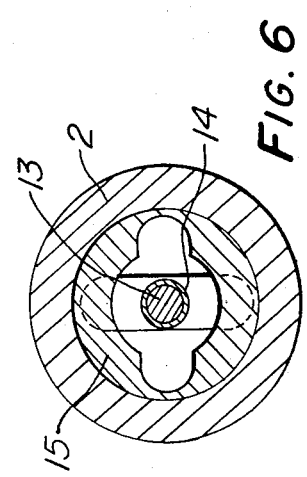
Figure 2:
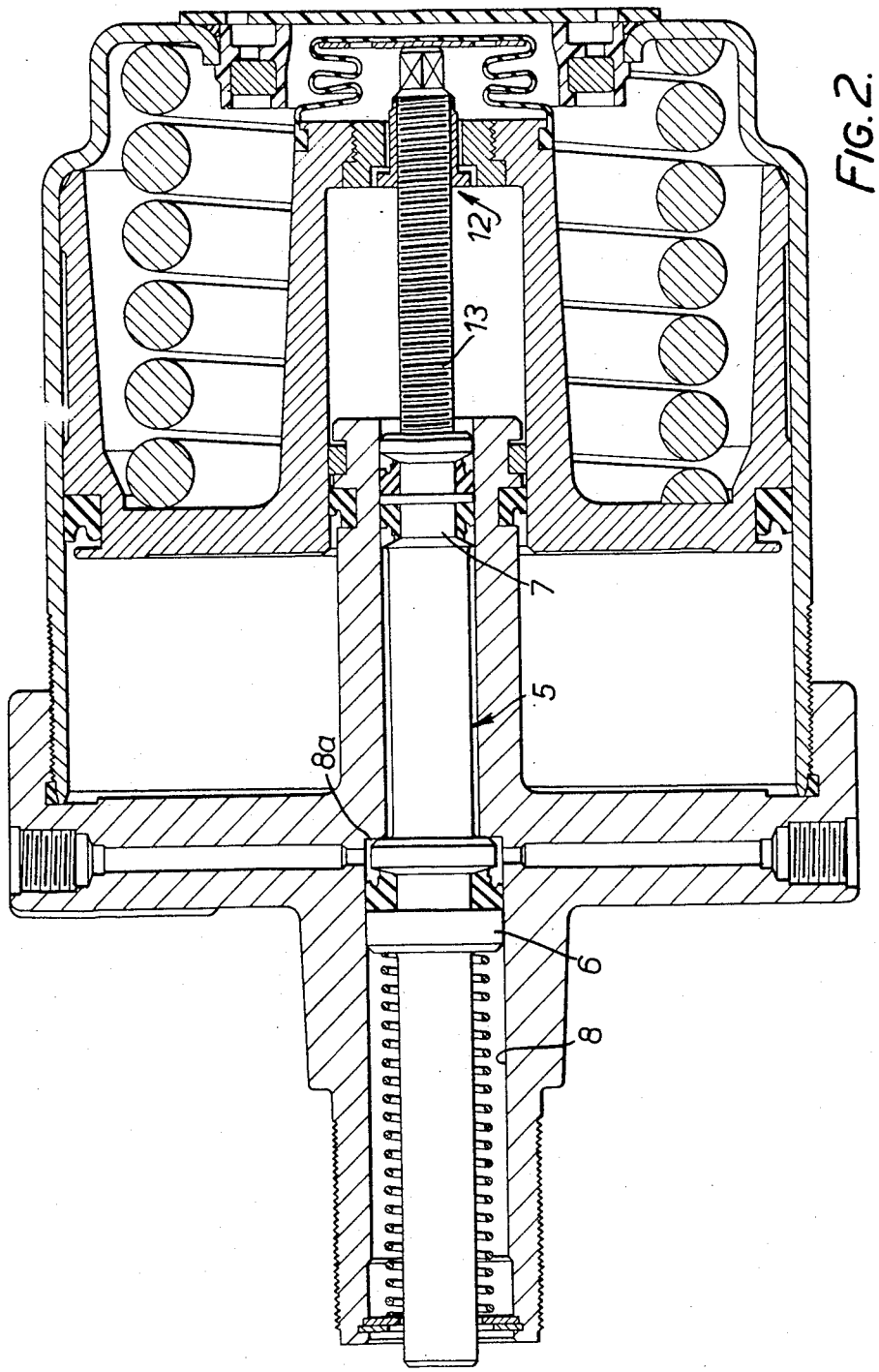
Figure 3:
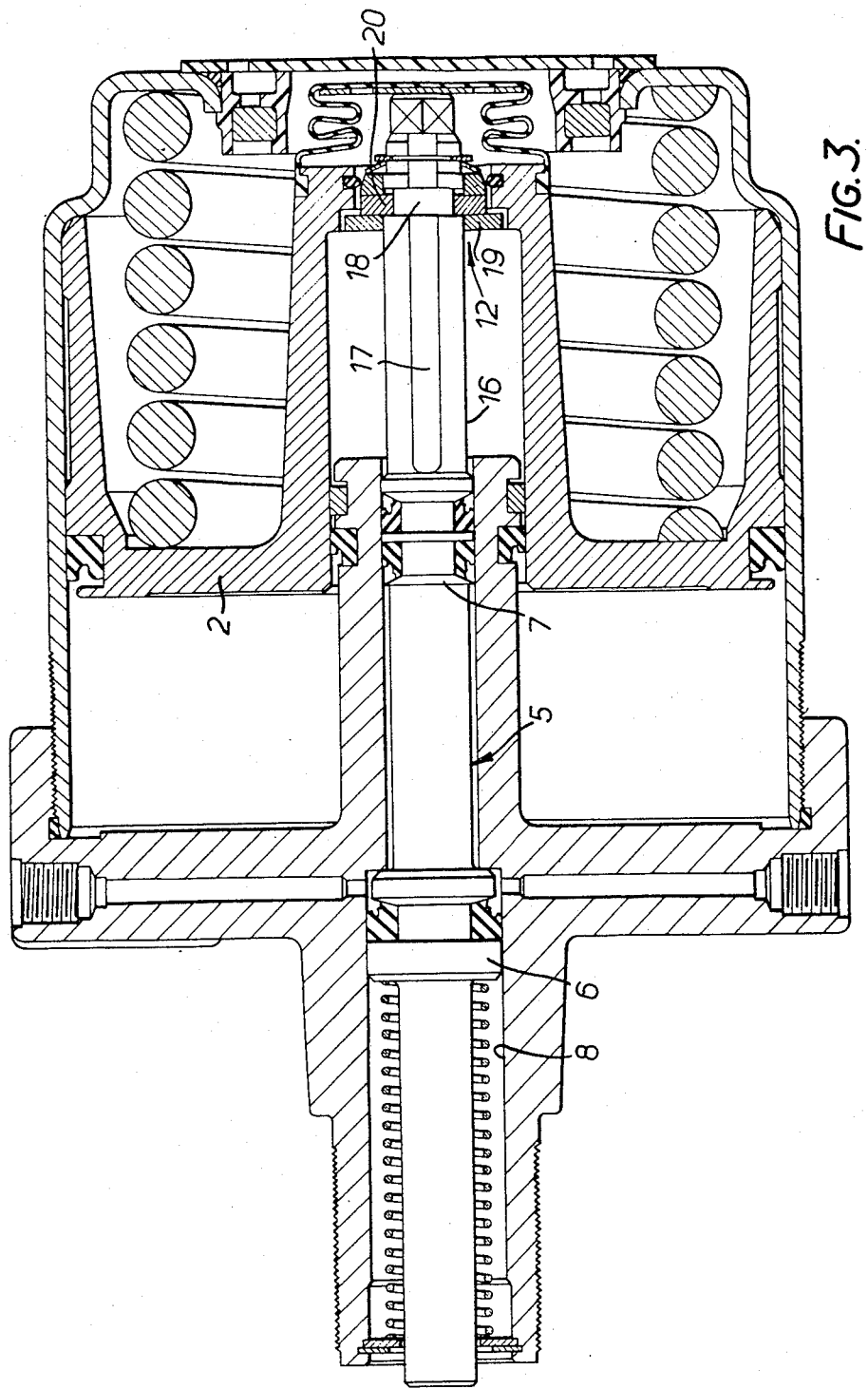
Figure 4:
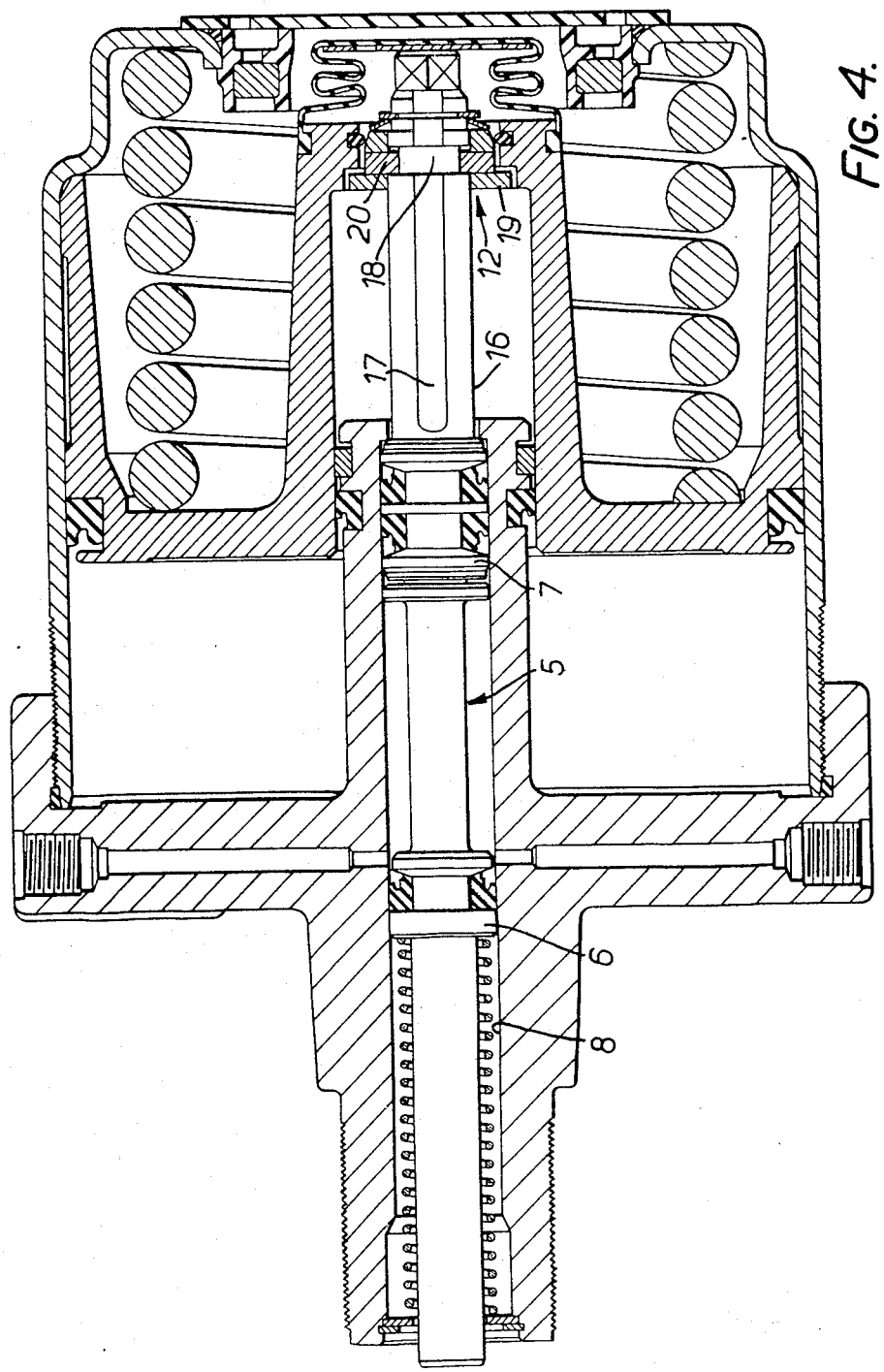

Several embodiments of vehicle wheel brake actuators in accordance with the invention will now be described, by way of example with reference to the accompanying drawings in which:

FIG. 1 is a sectional view of one form of brake actuator incorporating one form of release means, FIG. 2 is a sectional view of another form of brake actuator incorporating the release means of FIG. 1, FIG. 3 is a sectional view of the brake actuator of FIG. 1, but incorporating a different form of release means, FIG. 4 is a sectional view of the brake actuator of FIG. 2, but incorporating the release means of FIG. 3, FIG. 5 is a sectional view of another actuator incorporating yet another release means, and FIG. 6 is cross sectional view taken substantially on the line 6—6 of FIG. 1.

Each of the actuators is illustrated in its inoperative (i.e. "brakes off") position and comprises a housing 1 having a part 1a screw threadedly connected to an annular flange part 1b within which a piston 2 is sealingly slidable. The piston 2 is biassed to the left as shown by a coil compression spring 3, the piston being held in the position shown by fluid pressure in a chamber 4 which is connected to a fluid pressure source.

A service brake piston assembly 5 comprises an inner part 6 and an outer part 7 respectively carrying seals and is slidable in a central cylinder 8 with which ports 9, which are connected to the pressure source, communicate. The piston assembly 5 engages or is integral with a push rod 11 which is arranged to actuate a mechanism on the associated wheel brake in a known manner.

In the actuator of FIG. 1, the cylinder 8 has a bore of constant diameter and the piston assembly parts 6 and 7 constitute separate pistons, the part 6 constituting the service brake piston, and the part 7 constituting an anti-compounding piston subject in operation to the service brake pressure in cylinder 8.

The release means 12 is carried by a force-transferring member 13 integrally attached at its inner end to the outer piston 7. A bush 17 is screw threadedly connected at or near the other outer end of the release member 13, and is a loose fit within a radially outer bush 15 screw threadedly connected to the piston 2, the bushes having complementary shoulders, which are normally spaced apart and which permit movement of the inner bush 14 relative to the outer bush 15 in an axial direction to the left as seen in the drawings but which prevent relative axial movement in the other direction.

In normal operation of the actuator, the chamber 4 is pressurised to hold off the piston 2 and service brake operation is effected by supplying fluid pressure to the cylinder 8 through the ports 9 to move the inner piston 6 to the left to actuate the brake. During service brake operation the piston 7 remains stationary and is held against an annular shoulder 10 at the right hand end of the cylinder 8 by the fluid pressure in the cylinder.

In the event of pressure failure, the service brake piston will be moved to apply the brake when the chamber 4 is relieved of pressure, the bias of spring 3 causing movement of the piston 2, release member 13 and thus the piston assembly 5 to the left to apply the brake. The brake thus applied can be released manually by unscrewing the member 13, which is integral with inner piston 7, from the bush 14, which is frictionally held against rotation by the bush 15. The member 13 is thus moved axially relative to the piston 2 to permit movement of the inner piston 6 to the right to release the brake.

The outer end of the bush 14 protrudes through the bush 15 and may be provided with flats so that it can be held by a spanner against rotation while the member 13 is unscrewed.

In an optional arrangement as shown in FIG. 6 the bush 14 is non-circular, for example oval-shaped and the hole of the outer bush as a similar non-circular shape, so that the bush 14 need only be partially rotated through an angle of about 90° relative to the outer bush 15 to move the shoulders of the bushes out of co-operation with each other and permit movement of the member 13 and inner piston 7 to the right to release the brake.

The arrangement of FIG. 2 is generally similar to that of FIG. 1, the main differences being that the piston parts 6 and 7 are integral to form a single service brake piston, and the inner part 6 has a larger diameter than the outer part 7. The bore of the cylinder 8 is suitably stepped at 8a to accommodate the different piston parts and in the illustrated inoperative condition of the actuator, the piston 6 engages the stop 8a. The operation of the actuator and particularly the release means 12 is generally the same as that of FIG. 1.

The actuator of FIG. 3 is similar to that of FIG. 2 but having different release means 12. In this case the release means is carried by the force-transferring member 16 integrally attached at its inner end to the outer piston part 7 and having a pair of diametrically opposed longitudinal slots or grooves 17 in its surface and a circumferential groove 18 crossing the longitudinal groove 17 near the other outer end of the release member 16. A bush 19 surrounds the circumferential groove and carries a pair of diametrically opposed pins or pegs 20 which co-operate with the circumferential groove 18 in the normal positon to prevent relative axial movement between the member 16 and the bush 19. The bush 19 has a shoulder which co-operates with a complementary shoulder on the piston 2 to allow movement of the bush only in a direction to the left as seen in the drawings, the shoulders normally being spaced apart.

The operation of the actuator is generally the same as the previously described actuators, but in the event of a pressure failure the brake is released by partial rotation of the member 16 through an angle of say 90° until the pegs 20 are aligned with the longitudinal slots 17, the member 16 and inner piston 7 then being moved to the right to permit movement of the piston 6 to release the brake.

The actuator of FIG. 4 is similar to that shown in FIG. 1 but having the release means of the actuator of FIG. 3. Its operation is generally similar to the above described actuators.

The actuator illustrated in FIG. 5 has a service brake piston assembly 5 similar to that of FIGS. 2 and 3, but has different release means 12. In this embodiment the piston 2 has a screw-threaded central aperture 21 which receives a threaded annular thrust member 22 having a pair of opposed frusto-conical surfaces 23,24.

The force-transferring means comprises a push rod 25 having its inner end integral or otherwise fast with brake piston 7 and the other outer end located within the bore of the thrust member 22. The push rod 25 has a counterbore 26 in its outer end within which is located a release plunger 27 having a frusto-conical or wedge portion 28. A plurality of balls 29 are respectively retained in circumferentially spaced apertures in the wall of the counterbore 26 in abutting engagement with the frusto-conical portion 28 of plunger 27 by a cylindrical member 31 which is retained in position by an end cap 32 screw-threadedly connected in the outer, open end of counterbore 26. The plunger 27 is biased by a coil compression spring 33 into engagement with the balls 29 and has an elongate portion 34 which projects outwardly through the end cap 32.

If the fluid pressure in chamber 4 is released for parking brake operation or as a result of a pressure failure, the piston 2 and the thrust member 22 are moved to the left under the bias of spring 11. The frusto-conical surface 23 of the thrust member 22 wedges the balls 29 and moves the push rod 25 and the piston assembly 5 to the left to apply the brake. In normal parking brake operation, the brake is released by reintroducing fluid pressure into chamber 4 to move the piston 2 against the bias of spring 11. If there is a pressure failure the brake is released by pressing the portion 34 of the plunger 27 against the bias of spring 33. This enables the balls 29 to move radially inwardly out of engagement with the surface 23 of the thrust member 22 to allow the push rod 25 and thus the piston assembly 5 to move to the right to release the brake.

The frusto-conical surface 24 enables the piston 2 to be automatically restored to its normal position when pressure is restored after failure. In the released condition the thrust member 22 is to the left of balls 29, but when pressure is applied to chamber 4 the piston 2 moves to the right and the tapered surface 24 of thrust member 22 urges the balls 29 radially inwardly against the wedge portion 28 of plunger 27 to compress the spring 33, thus permitting the thrust member 22 to ride over the balls to its illustrated position.

It will be appreciated that in each of the above described embodiments the force transferring and release means are supported independently of the piston 2 so that there is no danger of the release means being corroded in the piston due to non-use. Thus, the piston 2 will not be damaged when the release means is operated to release the brake when the pressure has failed. Furthermore, there are described above quick-release arrangements in which the release means merely has to be moved through a small distance compared with the stroke of the piston assembly 5, for example by partial rotation, say through an angle of 90°, or by small axial movement.

We claim:

1. A vehicle wheel brake actuator comprising a first cylinder, a first fluid pressure operable member working in said first cylinder for service braking, a second cylinder, second fluid pressure operable member working in said second cylinder for parking or emergency braking, spring biassing means urging said second member towards a brake-applying position, said second member being normally held-off in an inoperative position by an opposing fluid pressure, force transferring means having axially inner and outer ends, said force-transferring means being supported at said inner end and extending axially outwardly and being movable with said second fluid pressure operable member upon release of said opposing fluid pressure whereby the force of said spring biassing means is transferred through said second member and said force transferring means to said first member, said force transferring means extending freely and with clearance through said second member and being disengaged from said second member when in its inoperative position and being engageable therewith upon release of said opposing fluid pressure, and manually operable quick release means movable to disengage said force transferring means from said second member in its brake-applying position, whereby to permit axial movement of said force transferring means relative to said second member to release said brake the clearance between and disengagement of said force transferring means and said second member in its inoperative position being such that there is unobstructed spacing between said second member and all of the force transferring means so as to prevent said force transferring means from being corroded in said second member due to non-use.

2. An actuator according to claim 1, wherein said force transferring means is supported at said inner end in said first cylinder and carries at said outer end said release means.

3. An actuator according to claim 2, wherein said force transferring means is integral with said first member, and wherein said first cylinder has a stop formed therein to limit axial outward movement of said first member, whereby said force transferring means is held out of engagement with said second member in its inoperative position.

4. An actuator according to claim 2, comprising an anti-compounding piston in said first cylinder subject to service braking pressure, wherein said first cylinder has a stop formed therein to limit axial outward movement of said first member, whereby said force transferring means is held out of engagement with said second member in its inoperative position.

5. An actuator according to claim 1, wherein said second member defines an aperture of non-circular cross-section, and wherein said release means comprises a sleeve of complementary cross-section secured to said outer end of said force-transferring means and located within said aperture and normally spaced from said second member, whereby in one relative angular position substantial movement of said sleeve relative to said second member in one axial direction is prevented and in another angular position such relative movement is permitted.

6. An actuator according to claim 1, wherein said release means comprises a sleeve assembly carried by said force-transferring means and normally spaced from said second member and prevent from substantial axial movement relative to said second member, said sleeve assembly including a plurality of radially inwardly extending projections, and wherein said force transferring means includes means defining a circumferential recess at said outer end, said projections normally co-operating with said circumferential recess to prevent substantial relative axial movement between said sleeve assembly and said force-transferring means, and means defining a plurality of longitudinally extending recesses, whereby rotation of said force transferring means relative to said sleeve assembly aligns said projections with respective one of said longitudinal recesses to permit axial movement of said force-transferring means relative to said second member.

7. An actuator according to claim 1, wherein said force-transferring means comprises a plurality of movable members projecting radially therefrom, said second member having a surface which is normally spaced from but engageable with said movable members to prevent substantial axial outward movement of said force transferring means relative to said second member, and wherein said release means comprises a release member carried by and axially movable relative to the force-transferring means, said release member engaging said movable members and being axially movable to permit radially inward movement of said movable members out of engagement with said surface of said second member to effect release of said force transferring means.

8. An actuator according to claim 7, wherein said force-transferring means defines a counterbore in said outer end having a wall with radial apertures extending therethrough said movable members being constituted by balls respectively mounted with said apertures, and wherein said release means comprises a plunger constituting said release member and having a frusto-conical surface, spring means biassing said plunger to a position in which said surface engages said movable member to urge the latter radially outwardly, a sleeve member surrounding said force transferring means and defining apertures therein aligned with said apertures in said counterbore wall and of smaller diameter than said balls, whereby said balls are retained in said counterbore wall.

9. The vehicle wheel brake actuator of claim 1 wherein a part of said first cylinder extends co-axially into said second cylinder, said second fluid pressure operable member having sliding and sealing engagement with the exterior surface of said extending part and including a central cylindrical part, said force transferring means being received within said central cylindrical part with its inner end supported in the extended part of said first cylinder and its outer end extending freely and with clearance through an aperture in the central cylindrical part of said second member when it is in its inoperative position, and cooperating abutment means carried by the central cylindrical part of said second member and said force transferring means for moving the latter with said second member upon release of said opposing fluid pressure.

10. The vehicle wheel brake actuator of claim 9 wherein said cooperating abutment means are constructed and arranged to be movable out of cooperating engagement with each other, said quick release means comprising manually operable means for selectively disengaging said abutment means when said second member is in its operative position.

11. The vehicle wheel brake actuator of claim 10 wherein the abutment means are arranged to be disengaged for quick release by partial rotation of one abutment means relative to the other.

12. The vehicle wheel brake actuator of claim 10 wherein one of said abutment means is movable radially relative to the other to effect disengagement, and axially moveable releasable locking means for retaining said radially moveable abutment means in its cooperating position relative to the other abutment means.

* * * * *